(12) United States Patent
Grandin

(10) Patent No.: US 8,200,912 B2
(45) Date of Patent: Jun. 12, 2012

(54) MULTI-CORE DEVICE WITH OPTIMIZED MEMORY CONFIGURATION

(75) Inventor: Emmanuel Grandin, Parce-sur-Sarthe (FR)

(73) Assignee: ST-Ericsson SA, Geneva (CH)

( * ) Notice: Subject to any disclaimer, the term of this patent is extended or adjusted under 35 U.S.C. 154(b) by 397 days.

(21) Appl. No.: 12/439,508

(22) PCT Filed: Aug. 28, 2007

(86) PCT No.: PCT/IB2007/053458
§ 371 (c)(1),
(2), (4) Date: Dec. 8, 2009

(87) PCT Pub. No.: WO2008/026165
PCT Pub. Date: Mar. 6, 2008

(65) Prior Publication Data
US 2010/0095047 A1      Apr. 15, 2010

(30) Foreign Application Priority Data
Aug. 31, 2006   (EP) ..................................... 06300905

(51) Int. Cl.
*G06F 12/00*   (2006.01)
*G06F 13/00*   (2006.01)
*G06F 13/28*   (2006.01)

(52) U.S. Cl. .......................... 711/147; 711/119; 711/170
(58) Field of Classification Search .................. 711/119, 711/147, 170
See application file for complete search history.

(56) References Cited

U.S. PATENT DOCUMENTS

| 7,003,623 B2 * | 2/2006 | Teng ............................ 711/104 |
| 2003/0163681 A1 | 8/2003 | Mann et al. |
| 2003/0200448 A1 | 10/2003 | Foster et al. |
| 2005/0128795 A1 | 6/2005 | DeHerrera et al. |

FOREIGN PATENT DOCUMENTS
EP   1679590 A1   12/2006

OTHER PUBLICATIONS

PCT International Search Report PCT/IB2007/053458, mailing date, Mar. 27, 2008.

* cited by examiner

*Primary Examiner* — Jared Rutz
*Assistant Examiner* — Ryan Bertram
(74) *Attorney, Agent, or Firm* — William J. Kubida; Peter J. Meza; Hogan Lovells US LLP

(57) ABSTRACT

A multi-core device for a piece of electronic equipment includes at least two cores arranged to execute different software portions stored on a memory means. At least one of these cores is associated with a primary RAM that is part of the memory means and arranged for persistent storage without power consumption.

18 Claims, 2 Drawing Sheets

MULTI-CORE DEVICE WITH OPTIMIZED MEMORY CONFIGURATION

CROSS-REFERENCE TO RELATED APPLICATIONS

The present application relates to and claims the benefit of and priority to PCT Application No. PCT/IB2007/053458 filed Aug. 28, 2007 which claims priority to European Patent Application No. EP 06300905.4 filed Aug. 31, 2006, both of which applications are hereby incorporated by reference in their entireties for all purposes as if fully set forth herein.

BACKGROUND OF THE INVENTION

1. Field of the Invention

Embodiments of the present invention relate, in general, to electronic equipments comprising at least two cores (i.e. processors or micro-controllers) each capable of executing instructions embodied as software.

2. Relevant Background

As is known by one skilled in the art, a core (also known as a microprocessor, processor core, processor or micro-controller) is a component of an electronic equipment which is provided for running software, i.e. code that is stored on an external ROM ("Read Only Memory"), such as a boot ROM, but not on the core internal ROM. Accordingly the software to be run has to be provided to the core in order to be executed. Several memory configurations may be used either for storing the software or for its execution.

In addition a core needs a dynamic memory, generically called RAM (for "Random Access Memory"), to temporarily store data associated with the running software and/or code for this software. Generally a core comprises an internal RAM, whose storing capacity (or size) is in most cases not sufficient to store all the needed data. In such a case an external RAM has to be associated with the core.

For example, the software to be executed can be stored in a NOR flash memory and executed from this NOR flash memory if allowed by its memory interface. For example a Pseudo-Static RAM ("PSRAM") can be used in association with a NOR flash memory to provide for dynamic memory storage of data associated with running software. In a variant of this configuration, the NOR flash memory can be replaced with a NAND flash memory, and the PSRAM can be replaced with Synchronous Dynamic RAM ("SDRAM"). In this variant the NAND flash memory content (the code to be executed) must be loaded into the SDRAM prior to running it because a NAND flash interface does not support direct code execution. Other memory configurations may be envisaged depending on the storing capacity needed (PSRAMs are cheaper than SDRAMs in lower densities, but SDRAMs are cheaper than PSRAMs in high densities) or on the Printed Circuit Board ("PCB") area that might be allocated for the memory components.

Some specific problems appear when applying these memory configurations to multi-core electronic equipments. For the sake of clarity one will consider hereafter the dual-core case.

In a dual-core electronic equipment, two cores (processors or micro-controllers) cooperate to achieve the equipment full potential. Accordingly, both cores have to be provided with software that is initially stored somewhere in external ROM (s) in the electronic equipment. In addition the cores must execute the software in some memory area while needing a RAM area (internal and/or external) for at least dynamic memory storage. Two classes of memory configuration are candidates to support such technical constraints.

In a first class, a first core manages the storage of both portions of software (for instance into a NAND flash memory) and provides the second core with the software portion it has to execute (for instance by copy from the NAND flash memory to a RAM) at each equipment boot. In this case, each core must have its own RAM for data storage (or a more complex shared RAM to serve both cores), but the RAM memory for the second core has also to be designed and designated (in storage capacity (or size) and performance) in order to allow for internal software execution (because the second core cannot execute software from elsewhere). Such a constraint implies that the first core must act as a "master" while the second core acts as a "slave", at least during each boot phase, which also impacts the security policies (i.e. when software has to be verified prior execution by a core). The drawback of this first class resides in the time required at each boot to transfer software into the second core's RAM. This elapsed time might be not negligible (typically several seconds) and could penalize the overall equipment boot time.

In a second class, each core has its own memory configuration (for instance a first core with a NOR flash memory and a PSRAM, and a second core with a NAND flash memory and a SDRAM). This second class allows the dual processor core to reuse existing and proven single-core configurations on each side (behaving as two independent systems), and avoids issues that could arise from a common memory configuration (for instance an increased boot time). However this second class has two main drawbacks: first it implies higher cost and PCB area as each core has to be able to download its own software from an external source; and second having duplication of memories is more power consuming, which means that the power consumption cannot be optimized from an equipment wide perspective.

These and other deficiencies of the prior art are addressed by one or more embodiments of the present invention, as described by way of example herein.

BRIEF SUMMARY OF THE INVENTION

One embodiment of the present invention provides a multi-core device, suitable for equipping electronic equipment, wherein the multi-core device comprises at least two cores arranged to execute different software stored in distinct storage means. At least one of these cores is associated with i) a primary RAM type memory, the memory being part of the overall memory means and arranged for persistent (also referred to herein as durable) storage of a software to be executed on the core once it has been transferred and data associated with this software when it is executed, and iii) a memory interface coupled to the primary RAM memory and arranged to allow the associated core to execute the software stored in its associated primary memory and to access to the data associated with this software.

The multi-core device according to the invention may include additional characteristics considered separately or combined, and notably:
- another core (referred to herein as the other core) may be associated with a secondary memory being part of the device memory means, arranged for durably storing software to be executed by each of the cores and to transfer the durably (persistent) stored software so that it can be stored in the corresponding primary memory;
- the secondary memory can be a flash memory of the ROM type;

the other core can be associated with i) an external memory of the RAM type, being part of the device memory means, coupled to the secondary memory and capable of dynamically storing the software to be executed by the other associated core(s) once it has been transferred from this secondary memory, and ii) a memory interface coupled to the external memory and arranged to allow the other core to execute the corresponding software stored in the external memory;

according to another embodiment of the present invention the other core may comprise an internal memory of the RAM type as part of the device memory means wherein the RAM type memory is coupled to the secondary memory and capable of dynamically storing the software to be executed by the associated other core once it has been transferred from the secondary memory. In this case, the secondary memory is arranged to transfer a durably stored software in order it could be stored into the internal memory to be executed by the other core;

each core may be associated with i) a primary RAM type memory, said memory being part of the device memory means and arranged for durable persistent storage, a software, to be executed once it has been transferred, and data, associated with this software when it is executed, and ii) a memory interface coupled to the primary memory and arranged to allow this associated core to execute the software durably stored into the associated primary memory;

it may further comprise an external memory connected to one of the cores and arranged for storing the code of the software before their transfer into the primary memories;

each primary memory can be a Magnetic Random Access Memory ("MRAM"), for instance, or any other RAM type of memory with the following comparable (or equivalent) characteristics:
a. at least the same data retention time without power supply (preferably infinite),
b. at least the same maximum number of writing cycles (preferably unlimited),
c. less or equal power consumption during read and write operations (preferably equivalent to a SDRAM or a PSRAM),
d. at least same speed during these latter operations (read and write) (preferably comparable to a SDRAM),
e. at least the same density (and preferably comparable to a SDRAM).

According to another embodiment of the present invention an electronic apparatus includes a multi-core device such as the one introduced above. Such an apparatus can be a mobile telephone, a computer (possibly of the portable type), a game or audio or video player, a television, a set-top box or a personal digital assistant (PDA), for instance.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE SEVERAL VIEWS OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein.

The appended drawings may not only serve to complete the invention, but also to contribute to its definition, if need be. One skilled in the art will readily recognize from the following discussion that alternative embodiments of the structures and methods illustrated herein may be employed without departing from the principles of the invention described herein.

DETAILED DESCRIPTION OF THE INVENTION

Figure 1:
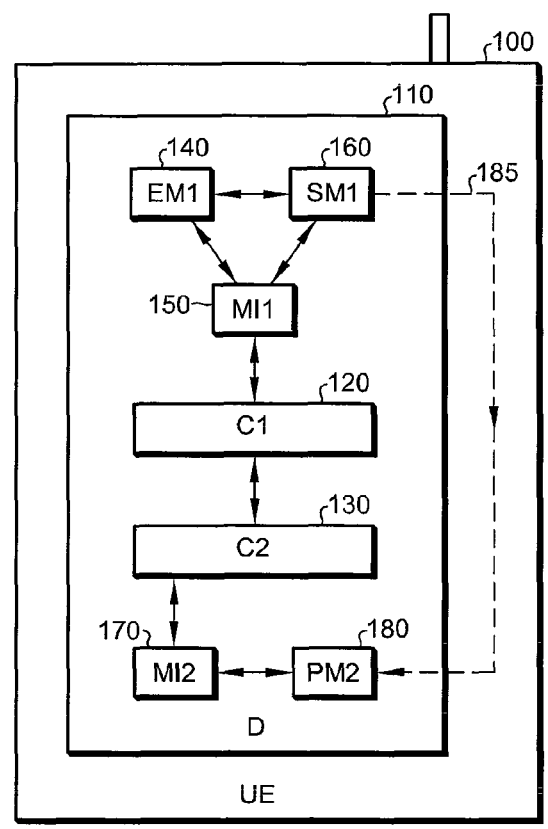
FIG. 1 schematically illustrates an example of an electronic device comprising one embodiment of a dual-core device according to the present invention.

Reference is initially made to FIG. 1 to describe one example of a multi-core device D according to the present invention. In the following description it will be considered that the multi-core device D equips an electronic apparatus ("UE"), such as a mobile telephone. But, as one skilled in the relevant art will recognize, the invention is not limited to this type of electronic apparatus and rather the present invention applies to any type of electronic equipment, adapted or not to telecommunications, needing or capable of utilizing at least two cores (i.e. processors or micro-controllers) cooperating to achieve chosen requirements. Accordingly the present invention is equally operable in a personal digital assistant (PDA) or a computer, possibly of the portable type, or a (game or audio or video) player, or a television, or else a set-top box, for instance.

Moreover in the following description it will be considered that the multi-core device D comprises only two cores, in order to simplify the description of the invention. But, as one skilled in the relevant art will recognize the invention is not limited to a dual-core device. Indeed, the present invention applies to any device comprising two or more cores cooperating together.

As schematically illustrated in FIG. 1, a dual-core device D 110 according to the present invention comprises at least first C1 120 and second C2 130 cores arranged to execute different code that is stored into storing means of this device D 110.

In the following description it will be considered that the first core C1 120 is intended for executing a first software S1 (not shown), while the second core C2 130 is intended for executing a second software S2 (not shown) (different from the first one S1). But, each core Ci (here i=1 or 2) 120, 130 may be intended for executing one or more portions of code.

For instance, the first core C1 120 can be a telecom processor while the second core C2 130 an application processor.

According to one embodiment of the present invention at least the second core C2 130 is associated with a primary memory PM2 180 and a memory interface MI2 170. That is "associated with" means the second core C2 130 is to be coupled to a primary memory PM2 180 through a memory interface MI2 170.

Moreover, the "primary memory (PMi) means" is a memory of the RAM type, which is part of the memory means of the device D 110, and is notably capable of storing data without consuming electrical power as long as it is not subject to a new data reading or writing cycle. According to this embodiment of the present invention, the primary memory PMi (associated with a core Ci) is intended for storing, on the one hand, the data defining a transferred (or downloaded) software Si (i.e. the code) which must be executed by this core Ci, and on the other hand, data which are associated with this software Si when it is executed by this core Ci.

For instance, a primary memory PMi can be a Magnetic Random Access Memory ("MRAM"). But, a primary memory PMi may be a memory having characteristics equivalent to or better than the ones of a MRAM, and more generally it may be any type of RAM offering the six following characteristics: i) compatibility with a memory interface MIi (in order to allow execution of a software Si it stores by the associated core Ci), ii) at least the same data retention time without power supply as a MRAM, and preferably an infinite data retention time, iii) at least the same maximum number of writing cycles as a MRAM, and preferably an unlimited number, iv) less or equal power consumption during read and write operations as a MRAM, and preferably equivalent to a SDRAM or a PSRAM, v) at least same speed during the read and write operations, and preferably a speed comparable to a SDRAM, and vi) at least the same density as a MRAM, and preferably comparable to the one of a SDRAM.

The memory interface MIi is coupled, according to one embodiment of the present invention, to a primary memory PMi and allows a core Ci, to which it is connected to, to execute software Si, that is durably stored in its primary memory PMi.

In this first example embodiment of the present invention illustrated in FIG. 1, the first core C1 120 is associated with an external secondary memory SM1 160, which is also part of the device memory means. This secondary memory SM1 160 is capable of storing in a durable manner the codes of software Si (here S1 and S2) (not shown), which must be executed by each core Ci 120, 130. It can also be arranged to transfer a durably stored software Sj (here j=2) into the corresponding primary memory PMj (j=2). The transfer of the second software S2 into the primary memory PM2 180 is preferably carried out through the memory interface MI1, then the first core C1, then the second core C2 and finally the memory interface MI2 170. So in this case the secondary memory SM1 160 is also coupled to the memory interface MI1 150. But in a variant the coupling between the secondary memory SM1 160 and the primary memory PM2 180 could be direct 185.

Such a secondary memory SM1 160 may be a flash memory of the ROM type, for instance a NOR or NAND flash memory, a hard-disk storage, or the like.

With such an arrangement, the second software S2 is transferred (or downloaded) from the secondary memory SM1 160 into the primary memory PM2 180 at the very first boot of the electronic equipment UE 100 or each time the electronic equipment UE 100 wants (or needs) to update it.

The secondary memory SM1 160 can be provided with a software Si or a new release of a software Si by a computer or a communication network to which its electronic equipment UE 100 is connected.

Accordingly, once the transfer of the second software S2 (i.e. the code) has been performed, the second core C2 130 becomes autonomous with regards to the first core C1 120. Therefore it can execute the second software S2 in an independent manner, and thus no time is lost for transferring the second software S2 at each electronic equipment boot.

In the embodiment of the present invention illustrated in FIG. 1, the first core C1 120 is also associated with an external memory EM1 140 of the RAM type, which is part of the memory means of the device D 110. This external memory EM1 140 is coupled to the secondary memory SM1 160 and is capable of dynamically storing the code of the first software S1 once this code has been transferred (or downloaded) from the secondary memory SM1 160.

For instance, when the secondary memory SM1 160 is a NOR flash memory, the external memory EM1 140 can be a Pseudo-Static RAM ("PSRAM"). In this example, the PSRAM EM1 140 can be used to only store temporary data, whereas the code can be directly executed from the NOR flash memory SM1 160. In a variant of this configuration, when the secondary memory SM1 160 is a NAND flash memory, the external memory EM1 140 may be a Synchronous Dynamic RAM ("SDRAM"). In this variant the code cannot be executed directly from the NAND flash memory SM1 160 and has to be loaded into the SDRAM EM1 140 prior to being executed; the same situation occurs when the external memory EM1 140 is a hard-disk storage.

In the first embodiment of the present invention illustrated in FIG. 1, the first core C1 120 is also associated with a memory interface MI1 150. This memory interface MI1 150 is coupled to the external memory EM1 140 and allows the first core C1 120, to which it is coupled, to execute the first software S1 whose code is stored into this external memory EM1 140.

This first example of the present invention reduces the cost of the device D 110 and the area occupied by the device memory means in the printed circuit board ("PCB"). Indeed the second core C2 130 is now associated with a primary memory PM2 180 (for instance a MRAM) instead of being associated with a flash memory and an external RAM as it could be the case in a device of the prior art. The configuration of the present invention induces a decrease of the power consumption due to the use of only one chip (for the primary memory PM2 180), but also because this chip is a MRAM (or an equivalent) that does not need power to retain data (as it is the case of the flash memories) while being not limited in the number of data writing cycles. Moreover, this MRAM (or any equivalent) retaining its data, the boot phases (except the first one) take less time than in the case of a device of the prior art containing only an external RAM for the core C2 130.

Figure 2:
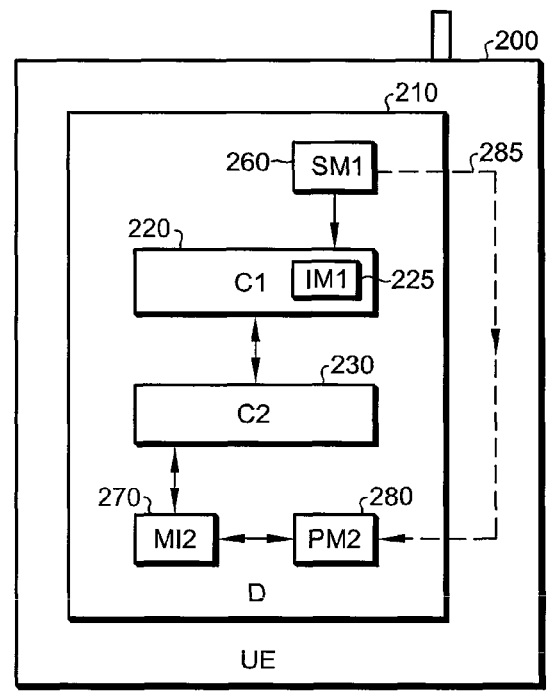
FIG. 2 schematically illustrates an example of an electronic device comprising another embodiment of a dual-core device according to the present invention.

With reference in addition now made to FIG. 2, a second example of an embodiment of a multi-core device D 210 according to the invention is shown. This second example is a variant of the first example above described with reference to FIG. 1. In this second example the memory configuration of the second core C2 320 is identical to the one of the first example. So the second core memory configuration only comprises a primary memory PM2 280 (which is coupled to the second core C2 230 through a memory interface MI2 270).

In this second embodiment the memory configuration of the first core C1 220 comprises an (external) secondary memory SM1 260 coupled to an internal memory IM1 225. More precisely, the first core C1 220 comprises an internal memory IM1 225 of the RAM type, which is part of the device memory means and is coupled to the secondary memory SM1 260 in which the code of the first software S1 (but also the code of the second software S2) is durably stored. This internal memory IM1 225 is intended for dynamically storing the code of the first software S1 that can be executed by the first core C1 220 once this code has been transferred (or downloaded) from the secondary memory SM1 260. The coupling between the secondary memory SM1 260 and the internal memory IM1 225 is usually carried out through the first core C1 220 (as illustrated). But in another embodiment of the present invention the secondary memory SM1 260 could be directly coupled to the internal memory 225.

So, the secondary memory SM1 260 is arranged to transfer the durably stored first S1 and second S2 software portions respectively into the internal memory IM1 225 of the first core C1 220 and into the primary memory PM2 280 associated with the second core C2 230 in order they could be executed in an autonomous way by these first C1 220 and second C2 230 cores. As illustrated, the transfer of the second software S2 into the primary memory PM2 280 is preferably carried out through the first core C1 220, then the second core C2 230 and finally the memory interface MI2 270. But in another variant of the present invention the coupling between the secondary memory SM1260 and the primary memory PM2 280 could be direct 285. Such a secondary memory SM1 260 may be a flash memory of the ROM type, for instance a NOR or NAND flash memory or a hard-disk storage.

Figure 3:
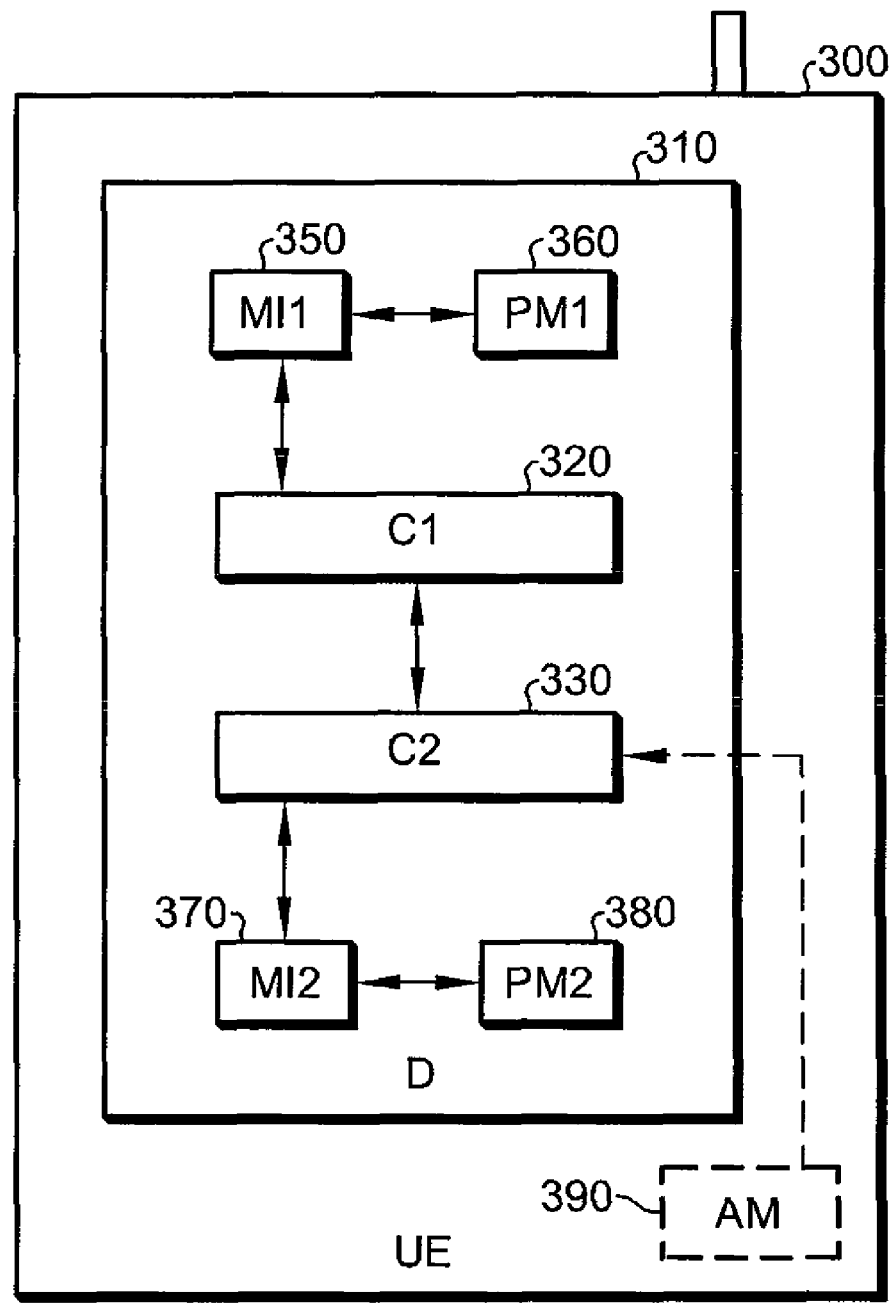
FIG. 3 schematically illustrates an example of an electronic device comprising yet another embodiment of a dual-core device according to the present invention.

Reference is now made in addition to FIG. 3 to describe a third example of one embodiment of a multi-core device D 310 according to the present invention. In this third example the memory configurations of the first C1 320 and second C2 330 cores are similar (but not necessarily identical). More precisely, the memory configuration of each core C1 320 is similar to the memory configuration of the second core C2 330 of the first example above described with reference to FIG. 1. So, the memory configuration of each core Ci comprises only a primary memory PMi (corresponding to the definition given above), coupled to the associated core Ci through a memory interface MIi.

The primary memory PM1 360 associated with the first core C1 320 can be identical to the primary memory PM2 380 associated with the second core C2 330. For instance, they are both of the MRAM type. But this is not mandatory and depends on the software Si they are respectively intended to durably store.

As it is illustrated, before being transferred (or downloaded) into the primary memories PMi, the software code Si may be stored into an external auxiliary memory AM 390 of the ROM type. Such an auxiliary memory AM 390 may be either part of the device D 310, or part of the electronic equipment UE 300 as illustrated in FIG. 3. It is important to notice that this external auxiliary memory AM 390 is optional, because the primary memories PM1 360 and PM2 380 might also be populated during manufacture, or maybe only primary memory PM1 360 may be populated, PM1 360 then takes the role of both the secondary memory SM1 160 and the external memory EM1 140 illustrated in FIG. 1.

However, this external auxiliary memory AM 390 can be seen as a backup storage of the software S1 and S2 in case of a global failure of the system (corruption of the versions of the software S1 and S2 contained into the primary memories PM1 360 and PM2 380), in order to be able to get back to a well-known user equipment state (factory settings).

The external auxiliary memory AM 390 must be connected to one of the cores Ci (for instance C2 360 as illustrated), which then becomes responsible for the user equipment boot phase and has to transfer (if necessary) software S1 and/or S2 into the primary memory PM1 360 and/or the primary memory PM2 380.

This auxiliary memory AM 390 is arranged to transfer (or download) the code of the software Si so that it could be stored into the corresponding primary memory PMi at the very first boot of the electronic equipment UE 300 or each time the electronic equipment UE 300 wants (or needs) to update at least one of them.

When this external auxiliary memory AM 390 is present, it can be provided with a software Si or a new release of a software Si by a computer or a communication network to which its electronic equipment UE 300 is connected. With such an arrangement, software Si are transferred (or downloaded) from the auxiliary memory AM 390 into the primary memories PM1 360 and PM2 380 at the very first boot of the electronic equipment UE 300 or each time the electronic equipment UE wants (or needs) to update one of them.

So, once the transfer of the software S1 and S2 (i.e. the codes) have been performed, the first C1 320 and second C2 330 cores become autonomous. Therefore each core Ci can execute its software Si in an independent manner, and thus no time is lost for transferring the software Si at each boot.

This third example of embodiment allows to still more reduce the cost of the device D 310 and the area occupied by the device memory means in the printed circuit board ("PCB"). Indeed each core Ci is now associated with a primary memory PMi (for instance a MRAM) instead of being associated with a flash memory and an external RAM as it is the case in a device of the prior art. This results in an important decrease of the power consumption due to the use of only two chips (for the primary memories PM1 360 and PM2 380), but also because these chips are MRAMs (or equivalents) that do not need power to retain data (as it is the case of the flash memories) while being not limited in the number of data writing cycles.

The multi-core device D 110, 210, 310, according to embodiments of the present invention, can be an integrated circuit realized in CMOS technology or in any technology used in chip industry fabrication. It might also be composed of several integrated circuits (ICs), for example one integrated circuit (IC) for each core or memory, which can also be stacked in some packages or popped together, or also one integrated circuit (IC) for each (core and memory) subsystem (for example C2, MI2 and PM2 could be part of the same IC).

The invention is not limited to the embodiments of multi-core device and electronic equipment described above, only as examples, but it encompasses all alternative embodiments which may be considered by one skilled in the art within the scope of the claims hereafter.

The invention claimed is:

1. A multi-core device comprising:
   at least two cores each operable to execute instructions embodied as software stored on a persistent memory means, wherein at least one of said at least two cores is associated with a primary memory of said memory means, said primary memory being random access memory ("RAM"),
   a first software portion stored in said primary memory to be executed by said at least one of said at least two cores once said first software portion has been transferred from said primary memory along with data associated with said first software portion, and
   a memory interface interposed between and coupled to said RAM and to at least one of said at least two cores, for allowing said at least one of said at least two cores to execute said first software portion stored in said primary memory and to access the data associated with said first software portion,
   wherein another one of said at least two cores is associated with a secondary memory that is a part of said memory means and is operable to persistently store software to be executed by each of said at least two cores and wherein said another one of said at least two cores is operable to transfer a software portion stored in the secondary memory to be stored in the primary memory wherein transferring said first software portion to the primary memory is conducted through a first memory interface, a first core, a second core and a second memory interface, in turn.

2. The multi-core device according to claim 1, wherein said secondary memory is a flash Read Only Memory ("ROM").

3. The multi-core device according to claim 1, wherein said another one of said at least two cores is associated with an external RAM memory which is part of said memory means, is coupled to said secondary memory and is operable of dynamically storing a second software portion to be executed by said another one of said cores upon said second software portion being transferred from said secondary memory, and another memory interface interposed between and coupled to said external RAM memory and said another one of said cores, said another memory interface operable to allow said another one of said cores to execute the second software portion stored in said external memory.

4. The multi-core device according to claim 1, wherein said another one of said at least two cores further comprises an internal RAM memory coupled to said secondary memory and operable to accept and store a second software portion transferred from said secondary memory wherein said second software portion is to be executed by said another one of said cores, said internal memory being part of said memory means.

5. The multi-core device according to claim 1, further comprising an external memory coupled to at least one of said at least two cores and operable for storing said software portions prior to their transfer to said primary memory.

6. The multi-core device according to one of claim 1 wherein said primary memory is a Magnetic Random Access Memory.

7. The multi-core device according to claim 1 wherein said primary memory includes characteristics equivalent to or better than Magnetic Random Access Memories.

8. The multi-core device according to claim 1 wherein said at least two cores are utilized in a piece of electronic equipment.

9. The multi-core device according to claim 8 wherein said piece of electronic equipment is selected from a group consisting of a mobile telephone, a computer, a portable computer, a game player, an audio player, a video player, a television, a set-top box and a personal digital assistant.

10. The multi-core device according to claim 8 wherein transfer of said durably stored software portion from said secondary memory to said primary memory occurs during a first boot of said piece of electronic equipment.

11. A method for multi-core processing of software in an electronic device, the method comprising:

storing in a secondary memory a plurality of instructions embodied as different software portions;

responsive to a first boot of said electronic device, transferring a first software portion from said secondary memory to a primary memory, wherein a second software portion is retained in said secondary memory;

accessing said first software portion by a first core and said second software portion by a second core from said primary memory and said secondary memory, respectively and autonomously; and executing at said first core and at said second core said first software portion and said second software portion respectively and autonomously, wherein transferring said first software portion to the primary memory is conducted through a first memory interface, a first core, a second core and a second memory interface, in turn.

12. The method of claim 11 wherein said first software portion is transferred to the primary memory directly.

13. The method of claim 11 wherein said primary memory and said secondary memory are operable for persistent storage.

14. The method of claim 13 wherein said primary memory is Random Access Memory.

15. The method of claim 14 wherein said primary memory is flash memory.

16. The method of claim 11 wherein said secondary memory is Read Only Memory.

17. The method of claim 11 further comprising storing the second software portion in an external memory coupled to said secondary memory.

18. The method of claim 11 further comprising storing the second software portion in an internal memory associated with said second core.

* * * * *